(12) United States Patent
Suzuki

(10) Patent No.: US 8,279,046 B2
(45) Date of Patent: Oct. 2, 2012

(54) RADIO COMMUNICATION APPARATUS, RADIO COMMUNICATION METHOD, AND RADIO COMMUNICATION SYSTEM

(75) Inventor: Shigeaki Suzuki, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 759 days.

(21) Appl. No.: 12/417,310

(22) Filed: Apr. 2, 2009

(65) Prior Publication Data

US 2009/0251292 A1 Oct. 8, 2009

(30) Foreign Application Priority Data

Apr. 3, 2008 (JP) ................................. 2008-097412

(51) Int. Cl.
*H04Q 5/22* (2006.01)
(52) U.S. Cl. ...................................... 340/10.2; 340/10.1
(58) Field of Classification Search ........................ None
See application file for complete search history.

(56) References Cited

U.S. PATENT DOCUMENTS

| 5,148,148 A * | 9/1992 | Shima et al. ............. 340/539.17 |
| 6,377,806 B1 * | 4/2002 | Tokuyoshi .................... 455/437 |
| 2006/0022800 A1 * | 2/2006 | Krishna et al. ............... 340/10.2 |
| 2007/0052524 A1 * | 3/2007 | Tanaka .......................... 340/10.2 |

FOREIGN PATENT DOCUMENTS

| JP | 04-063025 | 2/1992 |
| JP | 2007-067621 | 3/2007 |
| JP | 2007-104395 | 4/2007 |
| JP | 2008-22354 | 1/2008 |
| WO | 2006/011195 | 2/2006 |
| WO | 2007026412 A1 | 3/2007 |

OTHER PUBLICATIONS

Japanese Office Action for 2010-115649 mailed on Feb. 8, 2011.
Japanese Office Action for 2008-097412 mailed on Feb. 9, 2010.

* cited by examiner

*Primary Examiner* — Jennifer Mehmood
*Assistant Examiner* — Brian Wilson
(74) *Attorney, Agent, or Firm* — Turocy & Watson, LLP

(57) ABSTRACT

A radio communication apparatus stores, in a pattern storing unit, channel pattern data indicating radio channel switching order for searching for a free channel and stores switching condition data for the radio channel in a condition storing unit. A control unit of the radio communication apparatus switches, when the switching condition data stored in the condition storing unit is satisfied, the radio channel according to the switching order indicated by the channel pattern data stored in the pattern storing unit.

9 Claims, 6 Drawing Sheets

| Condition code | Condition contents |
|---|---|
| C0 | When CS error occurs |
| C1 | Always |
| C2 | When CS error and communication error occur |

| Pattern code | cn1 | cn2 | cn3 | cn4 | cn5 | cn6 | cn7 | cn8 | cn9 | In-use flag |
|---|---|---|---|---|---|---|---|---|---|---|
| P1 | 1 | 2 | 3 | 4 | 5 | 6 | 7 | 8 | 9 | 0/1 |
| P2 | 9 | 8 | 7 | 6 | 5 | 4 | 3 | 2 | 1 | 0/1 |
| P3 | 4 | 0 | 3 | 0 | 0 | 0 | 1 | 0 | 2 | 0/1 |
| P4 | 4 | 3 | 0 | 0 | 0 | 0 | 0 | 2 | 1 | 0/1 |
| P5 | 0 | 0 | 0 | 1 | 3 | 2 | 0 | 0 | 0 | 0/1 |
| ⋮ | ⋮ | ⋮ | ⋮ | ⋮ | ⋮ | ⋮ | ⋮ | ⋮ | ⋮ | ⋮ |

| Own IDa | Adjacent IDb | Adjacent IDc | Condition code | Pattern code |
|---|---|---|---|---|
| RWID1 | RWID2 | — | | |
| RWID2 | RWID1 | RWID3 | | |
| RWID3 | RWID2 | RWID4 | | |
| RWID4 | RWID3 | — | | |

FIG. 4

RADIO COMMUNICATION APPARATUS, RADIO COMMUNICATION METHOD, AND RADIO COMMUNICATION SYSTEM

CROSS-REFERENCE TO RELATED APPLICATION

This application is based upon and claims the benefit of priority from the prior Japanese Patent Application No. 2008-097412, filed Apr. 3, 2008, the entire contents of which are incorporated herein by reference.

TECHNICAL FIELD

The present invention relates to a radio communication technique for writing data on and reading data from radio communication media such as RFID (Radio Frequency Identification) tags using radio communication.

BACKGROUND

In recent years, a radio communication system called RFID system attracts attention. This system includes a small radio communication medium including an IC chip and an antenna and a radio communication apparatus called RFID reader writer. The radio communication apparatus writes data on and reads data from the radio communication medium in a non-contact manner using a radio wave or an electromagnetic wave.

An RFID system including plural RFID reader writers performs carrier sense to prevent radio waves output from the respective RFID reader writers from interfering with one another. The RFID reader writers search for free channels before outputting radio waves. When free channels are detected, the RFID reader writers output radio waves using the channels. Such a carrier sense system is called LBT (Listen Before Talk) system.

JP-A-2007-067621 discloses an RFID reader writer that detects, when abnormality is sensed in communication with a radio communication medium, a free channel again after a predetermined transmission pause time elapses and resumes the communication with the radio communication medium using the detected free channel.

However, even if the RFID reader writer detects the free channel, when other RFID reader writers in adjacent communication areas use channels of frequencies extremely close to that of the free channel, a communication error may occur because of the influence of the other RFID reader writers.

SUMMARY

It is an object of the present invention to prevent, as much as possible, a communication error due to the influence of other radio communication apparatuses in adjacent communication areas and realize improvement of communication efficiency.

According to an aspect of the present invention, there is provided a radio communication apparatus including: a pattern storing unit that stores channel pattern data indicating radio channel switching order for searching for a free channel; a condition storing unit that stores switching condition data for the radio channel; a condition determining unit that determines whether the switching condition data stored in the condition storing unit is satisfied; and a channel switching unit that switches, when the condition determining unit determines that the switching condition data is satisfied, the radio channel according to the switching order indicated by the channel pattern data stored in the pattern storing unit.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 2 is a diagram of a data structure example of a switching condition table provided in a store server in the embodiment;

FIG. 3 is a diagram of a data structure example of a switching pattern table provided in the store server in the embodiment;

FIG. 4 is a diagram of a data structure example of a reader writer setting table provided in the store server in the embodiment;

DETAILED DESCRIPTION

An embodiment of the present invention is explained below. In this embodiment, a radio communication system according to the present invention is applied to a commodity sales data processing system built in a store such as a supermarket.

Figure 1:
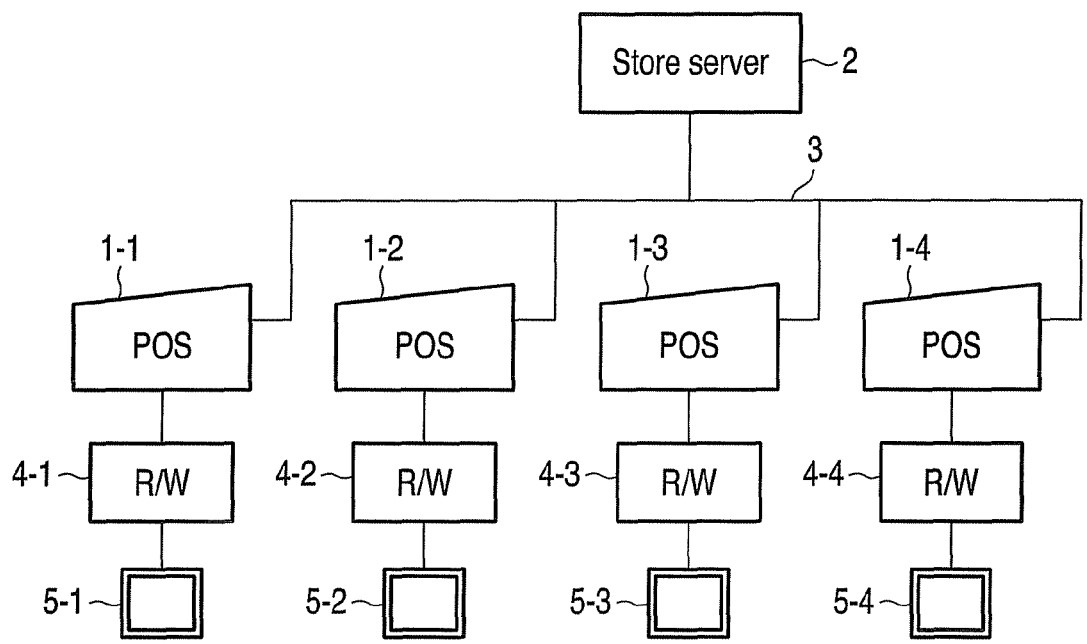
FIG. 1 is a block diagram of a schematic configuration of a commodity sales data processing system according to an embodiment of the present invention.

As shown in FIG. 1, in the commodity sales data processing system, plural (in the figure, four) POS terminals 1-1, 1-2, 1-3, and 1-4 and a store server 2 are connected by a network 3. RFID reader writers 4-1, 4-2, 4-3, and 4-4 are connected to the POS terminals 1-1 to 1-4, respectively.

The reader writers 4-1 to 4-4 perform radio communication with RFID tags via antennas 5-1 to 5-4, respectively, in order to read data of the RFID tags or write data in the RFID tags. The reader writers 4-1 to 4-4 use a UHF band (radio channels cn1 to cn9) of 952 MHz to 954 MHz.

Each of the RFID tags includes an antenna and an IC chip. The IC chip includes a power generating unit, a demodulating unit, a modulating unit, a memory unit, and a control unit that controls these units. The RFID tag is attached to each of commodities sold in the store. The RFID tag stores, in the memory unit, an ID unique to the commodity and commodity data such as a single item code for specifying the commodity to which the RFID tag is attached.

The antennas 5-1 to 5-4 are respectively attached to plural checkout counters set in parallel in a cashier section of the store. The reader writers 4-1 to 4-4 respectively read, via the antennas 5-1 to 5-4, data of RFID tags attached to commodities placed on the checkout counters. The POS terminals 1-1 to 1-4 subject sales data of commodities purchased by customers to registration processing according to commodity data read by the reader writers 4-1 to 4-4 from the RFID tags.

The store server 2 includes a switching condition table 11, a switching pattern table 12, and a reader writer setting table 13 as data tables for controlling operations of the reader writers 4-1 to 4-4.

As shown in FIG. 2, the switching condition table 11 stores condition data different from one another in association with unique condition codes. The condition data specify what kind of condition should be satisfied to execute switching of a radio channel for searching for a free channel out of plural radio channels.

In this embodiment, condition data specifying that the switching of a radio channel should be executed when a carrier sense error occurs is set in association with a condition code C1. Condition data specifying that the switching of a radio channel should be executed every time processing corresponding to a command (a read command, a write command, etc.) for performing data communication with an RFID tag is executed is set in association with a condition code C2. Condition data specifying that the switching of a radio channel is executed not only when a carrier sense error occurs but also when a communication error in communication with an RFID tag occurs is set in association with a condition code C3.

The communication error is a bit loss error, a transformed bit error, or the like that occurs in a data communication procedure for communication with an RFID tag, although a response signal from the RFID tag is received. Such an error could occur because of noise when the other reader writers use frequencies close to a frequency used by the reader writer 4.

The switching pattern table 12 stores, as shown in FIG. 3, selection order data for nine channels, i.e., radio channels cn1 to cn9, in association with unique pattern codes. The switching pattern table 12 also stores in-use flags in association with the pattern codes. The selection order data specify which radio channel should be used and in which order the channels should be switched to search for a free channel. The selection order data are "0" when the selection order data are not selected. The in-use flags are set to ON when any one of the RFID reader writers uses the selection order data corresponding thereto.

The number of pattern codes is larger than the number of RFID reader writers configuring the system. In this embodiment, selection order data [123456789] is set in association with a pattern code P1. The selection order data [123456789] indicates that the radio channels are switched in order of cn1, cn2, cn3, cn4, cn5, cn6, cn7, cn8, cn9, cn1, . . . . A correspondence relation between the other selection order data and the other pattern codes is as shown in FIG. 3.

The reader writer setting table 13 stores, as shown in FIG. 4, plural adjacent IDs (adjacent IDb and adjacent IDc), condition codes, and pattern codes in association with an identification code [RWID] of each of the reader writers 4-1 to 4-4. The adjacent IDs are identification codes [RWID] of the other reader writers having communication areas adjacent to a communication area of the certain reader writer. Identification codes RWID different from one another are set for the respective reader writers 4-1 to 4-4.

In this embodiment, a communication area of the reader writer 4-1 is adjacent to a communication area of the reader writer 4-2. The communication area of the reader writer 4-2 is adjacent to a communication area of the reader writer 4-3. The communication area of the reader writer 4-3 is adjacent to a communication area of the reader writer 4-4. Therefore, the reader writer setting table 13 stores data shown in FIG. 4.

Figure 5:
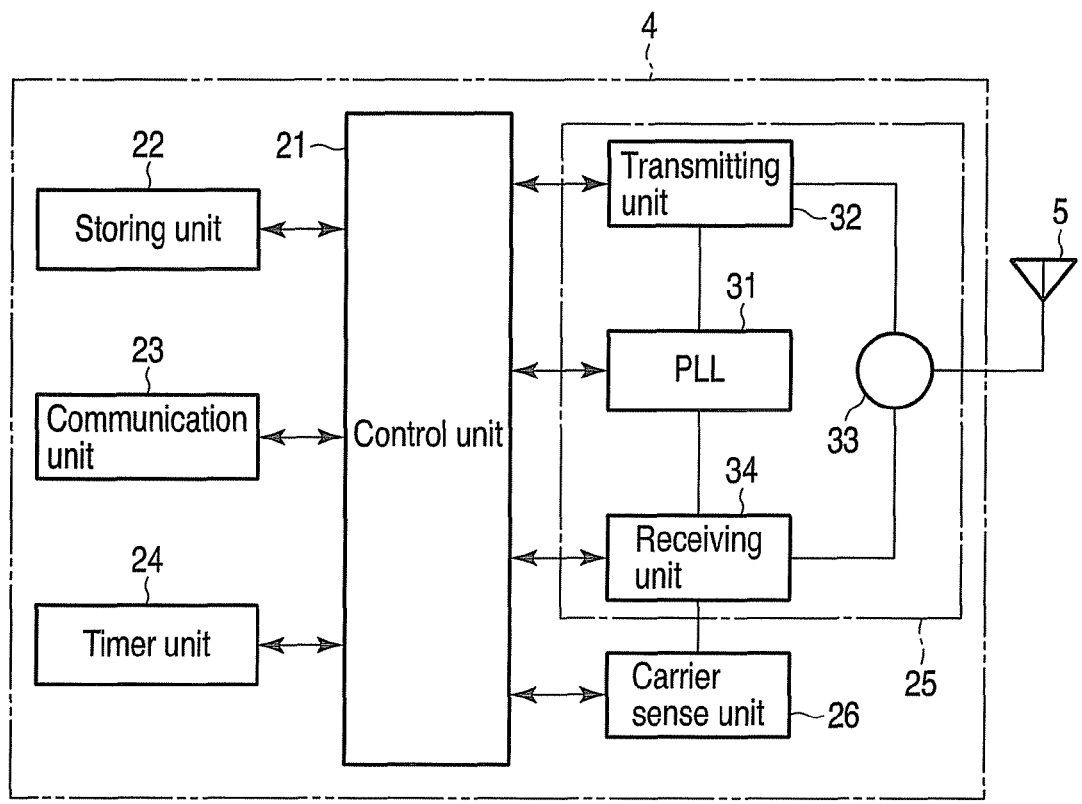
FIG. 5 is a block diagram of a main part configuration of an RFID reader writer according to the embodiment.

FIG. 5 is a block diagram of a main part configuration of the reader writers 4-1 to 4-4. Since the reader writers 4-1 to 4-4 have the same configuration, in the following explanation, the reader writers 4-1 to 4-4 are generally referred to reader writer 4. Likewise, the antennas 5-1 to 5-4 are generally referred to as antenna 5 and the POS terminals 1-1 to 1-4 are generally referred to as POS terminal 1.

The reader writer 4 includes a control unit 21 mainly including a CPU, a storing unit 22 having a ROM area and a RAM area, a communication unit 23, a timer unit 24, a radio circuit unit 25, and a carrier sense unit 26. The reader writer 4 performs data communication with the POS terminal 1 via the communication unit 23. The timer unit 24 counts monitoring time, operation control time, and the like explained later.

The radio circuit unit 25 includes a phase locked loop (PLL) circuit 31, a transmission unit 32, a circulator 33, and a receiving unit 34. The PLL circuit 31 generates a high-frequency sine wave signal. The transmitting unit 32 modulates transmission data transmitted from the control unit 21 and adds up a modulated signal of the transmission data and the sine wave signal supplied from the PLL circuit 31. The transmitting unit 32 amplifies an added-up signal and outputs the signal to the circulator 33. The circulator 33 outputs the signal input by the transmitting unit 32 to the antenna 5. The circulator 33 outputs the signal input by the antenna 5 to the receiving unit 34. The receiving unit 34 amplifies the high-frequency signal input by the circulator 33, combines the amplified high-frequency signal and the sine wave signal supplied from the PLL circuit 31, and converts a combined signal into a baseband signal. The receiving unit 34 demodulates the baseband signal and outputs a demodulated signal to the control unit 21.

The carrier sense unit 26 determines, with carrier sense by an LBT system, a state of use of a radio channel in a UHF band used by the reader writer 4. The LBT system limits time in which the reader writer 4 can operate once to maximum 4 seconds. When the reader writer 4 finishes operating once, the reader writer 4 pauses for 50 ms and, thereafter, becomes operable again only when a free channel is observed for 5 ms.

Figure 6:
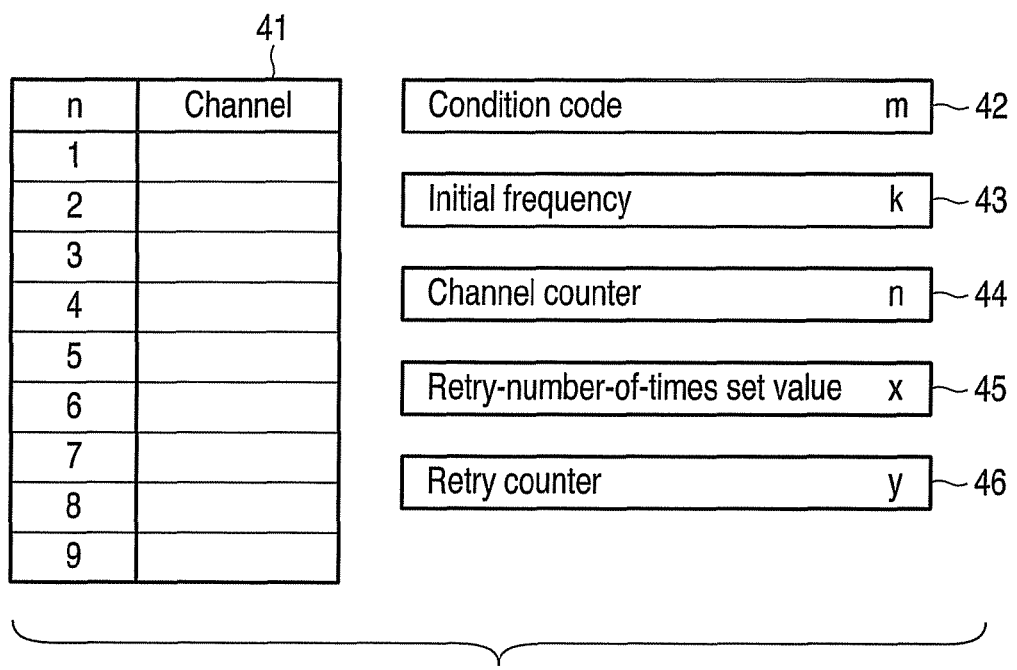
FIG. 6 is a diagram of a main memory area formed in a storing unit of the RFID reader writer in the embodiment.

In the reader writer 4, as shown in FIG. 6, a channel pattern table 41, a condition code memory 42, an initial frequency memory 43, a channel counter memory 44, a retry-number-of-times set value memory 45, and a retry counter memory 46 are formed in the RAM area of the storing unit 22.

The channel pattern table 41 stores channel pattern data indicating radio channel switching order for searching for a free channel. The condition code memory 42 stores switching condition data for a radio channel. The other memories 43 to 46 are explained as appropriate in the later explanation of operations of the reader writer 4.

The store server 2 can execute a reader writer setting job as one of program jobs thereof. When the reader writer setting job is selected out of job menu items, the store server 2 executes processing of a procedure shown in a flowchart of FIG. 7.

First, in ACT 1, the store server 2 displays an ID input screen for the reader writer 4 on a display thereof. This screen has an input area for the identification code [RWID] of the reader writer 4.

In ACT 2, the store server 2 stays on standby for the identification code [RWID] to be input. If an instruction for finishing the job is input (YES in ACT 3), the store server 2 finishes this processing.

If the identification code [RWID] is input to an input area of the ID input screen (YES in ACT 2), in ACT 4, the store server 2 reads out the adjacent IDb and the adjacent IDc of a record having the identification code [RWID] as an own IDa thereof from the reader writer setting table 13 and stores the adjacent IDb and the adjacent IDc in a work memory. In ACT 5, the store server 2 resets a counter "j" to "0".

In ACT 6, the store server 2 searches through the reader writer setting table 13 in order to determine whether a condition code Cj ("j" of Cj is a value of the counter "j") is being used by reader writers adjacent to the reader writer 4 specified by the identification code [RWID].

If the condition code Cj is stored in records respectively having, as the own IDa, the adjacent IDb and the adjacent IDc stored in the work memory (YES in ACT 6), the adjacent reader writers are using the condition code Cj. In this case, in ACT 7, the store server 2 increments the counter "j" by "1". In ACT 8, the store server 2 determines whether the counter "j" exceeds a maximum value jmax of the suffix "j" of the condition code Cj. If the counter "j" does not exceed the maximum value jmax (NO in ACT 8), the store server 2 returns to the processing in ACT 6.

In this embodiment, as shown in FIG. 2, there are three kinds of condition codes and suffixes of the condition codes are 0, 1, and 2, respectively. Therefore, the maximum value jmax is "2".

If the condition code Cj is not stored in the records respectively having, as the own IDa, the adjacent IDb and the adjacent IDc stored in the work memory (NO in ACT 6), the adjacent reader writers are not using the condition code Cj. In this case, in ACT 9, the store server 2 writes the condition code Cj in the record having the identification code [RWID] as the own IDa in the reader writer setting table 13.

Subsequently, in ACT 10, the store server 2 displays an unused pattern list on the display. This list is a list of pattern codes and selection order data of records with in-use flags set to OFF (0) in the switching pattern table 12. It is possible to select any one pattern code Ps.

If the pattern code Ps is selected (YES in ACT 11), in ACT 12, the store server 2 writes the pattern code Ps in the record having the identification code [RWID] as the own IDa in the reader writer setting table 13. In ACT 13, the store server 2 sets an in-use flag corresponding to the pattern code Ps in the switching pattern table 12 to ON. Thereafter, the store server 2 returns to the processing in ACT 1.

The store server 2 resets the screen of the display to the ID input screen for the reader writer 4. Thereafter, the store server 2 repeatedly executes the processing in ACT 1 to ACT 13 until an input of an instruction for finishing the job is received.

By executing such a reader writer setting job, it is possible to set a condition code and a pattern code for each of the reader writers 4-1 to 4-4 in the reader writer setting table 13.

In FIG. 1, it is assumed that condition codes and pattern codes are set in order of the reader writers 4-1, 4-4, 4-2, and 4-3.

In this case, first, an operator of the store server 2 inputs an identification code [RWID1] of the reader writer 4-1 on the ID input screen. A reader writer adjacent to the reader writer 4-1 is the reader writer 4-2. However, at this point, a condition code is not set for the reader writer 4-2. Therefore, a condition code C0 is set in a record of the identification code [RWID1] in the reader writer setting table 13.

Subsequently, the unused pattern list is displayed on the display of the store server 2. It is assumed that the operator selects a pattern code P5. Then, the pattern code P5 is set in the record of the identification code [RWID1].

The operator inputs an identification code [RWID4] of the reader writer 4-4 on the ID input screen. A reader writer adjacent to the reader writer 4-4 is the reader writer 4-3. However, at this point, a condition code is not set for the reader writer 4-3. Therefore, the condition code C0 is set in a record of the identification code [RWID4] in the reader writer setting table 13.

Subsequently, the unused pattern list excluding the pattern code P5 is displayed on the display of the store server 2. It is assumed that the operator selects a pattern code P3. Then, the pattern code P3 is set in the record of the identification code [RWID4].

The operator inputs an identification code [RWID2] of the reader writer 4-2 on the ID input screen. Reader writers adjacent to the reader writer 4-2 are the reader writers 4-1 and 4-3. The condition code C0 is already set for the reader writer 4-1. Therefore, since the counter "j" is counted up to "1" by the processing in ACT 6 to ACT 8, the condition code C1 is set in a record of the identification code [RWID2] in the reader writer setting table 13.

Subsequently, the unused pattern list excluding the pattern codes P3 and P5 are displayed on the display of the store server 2. It is assumed that the operator selects a pattern code P4. Then, the pattern code P4 is set in the record of the identification code [RWID2].

Finally, the operator inputs an identification code [RWID3] of the reader writer 4-3 on the ID input screen. Reader writers adjacent to the reader writer 4-3 are the reader writers 4-2 and 4-4. The condition code C1 is already set for the reader writer 4-2. The condition code C0 is set for the reader writer 4-4. Therefore, since the counter "j" is counted up to "2" by the processing in ACT 6 to ACT 8, the condition code C2 is set in a record of the identification code [RWID3] in the reader writer setting table 13.

Subsequently, the unused pattern list excluding the pattern codes P3 to P5 is displayed on the display of the store server 2. It is assumed that the operator selects the pattern code P1. Then, the pattern code P1 is set in the record of the identification code [RWID3].

Operations performed by the control unit 21 when power supplies for the respective reader writers 4-1, 4-2, 4-3, and 4-4 are turned on are explained with reference to flowcharts of FIGS. 8 to 11. First, operations performed when the power supply for the RFID reader writer 4-1 is turned on are explained.

When the power supply is turned on, first, in ACT 21, the control unit 21 of the reader writer 4-1 transmits a setting data inquiry command to the store server 2. The inquiry command includes the identification code [RWID1] of the reader writer 4-1. The inquiry command is transmitted through the POS terminal 1-1 corresponding to the reader writer 4-1 to the store server 2 via the network 3.

The store server 2 receives the inquiry command and searches through the reader writer setting table 13. The store server 2 reads out the condition code C0 and the pattern code P5 corresponding to the identification code [RWID1] in the inquiry command. The store server 2 searches through the switching pattern table 12 and reads out selection order data corresponding to the pattern code P5. The store server 2 creates channel pattern data on the basis of the selection order data.

In the case of the reader writer 4-1, since the selection order data is [000132000], channel pattern data [cn4, cn6, cn5, 0, 0, 0, 0, 0, 0] is created. The store server 2 returns a setting data response command including the condition code C0 and the channel pattern data [cn4, cn6, cn5, 0, 0, 0, 0, 0, 0]. The response command is transmitted through the network 3 to the reader writer 4-1 via the POS terminal 1-1.

In ACT 22, the control unit 21 stands by for the setting data response command. If the control unit 21 receives the response command (YES in ACT 22), in ACT 23, the control unit 21 stores the condition code C0 in the response command in the condition code memory 42. In ACT 24, the control unit 21 sets, in order of a channel number n=1 to 9, the channel pattern data [cn4, cn6, cn5, 0, 0, 0, 0, 0, 0] in the response command in the channel pattern table 41. Further, in ACT 25, the control unit 21 initializes a value "k" of the initial frequency memory 43 to "1", Thereafter, in ACT 26, the control unit 21 stands by for receiving a read command or a write command from the POS terminal 1-1. If the control unit 21 receives any one of the commands (YES in ACT 26), in ACT 27, the control unit 21 resets a count value "y" of the retry counter memory 46 to "0". In ACT 28, the control unit 21 sets the value "k" of the initial frequency memory 43 in the channel counter memory 44. In ACT 29, the control unit 21 searches through the channel pattern table 41 in order to determine whether channel data "cn n" of a channel number matching the count value "n" of the channel counter memory 44 is "0".

If the channel data "cn n" is "0" (YES in ACT 29), in ACT 32, the control unit 21 increments the count value "n" of the channel counter memory 44 by "1". In ACT 33, the control unit 21 determines whether the count value "n" exceeds a maximum value "9" of the channel number. If the count value "n" exceeds the maximum value of the channel number, in ACT 34, the control unit 21 resets the count value "n" to "1". Thereafter, the control unit 21 returns to the processing in ACT 29.

If the channel data "cn n" is not "0" (NO in ACT 29), in ACT 30, the control unit 21 executes carrier sense at a frequency of the channel data "cn n". The control unit 21 starts a monitoring timer of the timer unit 24. The control unit 21 determines whether the receiving unit 34 receives a frequency signal of the channel data "cn n" for time until the monitoring timer times out (in the LBT system, 5 ms). A CS signal read from the carrier sense unit 26 is used for the determination. The CS signal is at a "0" level in a state in which the receiving unit 34 does not receive the frequency signal of the channel data "cn n". When the receiving unit 34 receives the frequency signal, the CS signal changes to a "1" level. In ACT 31, the control unit 21 determines whether the CS signal is at the "0" level.

If the CS signal is at the "1" level (YES in ACT 31), the frequency of the channel data "cn n" is in use. In this case, the control unit 21 proceeds to processing in ACT 32. The control unit 21 increments the count value "n" of the channel counter memory 44 by "1". When the count value "n" exceeds the maximum value "9" of the channel number, the control unit 21 resets the count value "n" to "1". Thereafter, the control unit 21 returns to the processing in ACT 29.

If the CS signal is at the "0" level (NO in ACT 31), the frequency of the channel data "cn n" is free. In this case, in ACT 35, the control unit 21 executes command processing using the free channel "cn n". For example, if the command is a read command, the control unit 21 performs radio communication using the RFID tag present in a communication area of the antenna 5-1 and the free channel "cn n" and performs reading of data. At this point, the control unit 21 starts an operation limiting timer of the timer unit 24. If the command is a write command, the control unit 21 performs radio communication using the RFID tag present in the communication area of the antenna 5-1 and the free channel "cn n" and performs writing of data. At this point, the control unit 21 starts the operation limiting timer of the timer unit 24. In the LBT system, the operation limiting timer times out when the operation limiting timer reaches maximum operable time 4s.

In Act 36, the control unit 21 finishes a read operation or a write operation or stands by for the operation limiting timer to time out. When the operation is finished or the operation limiting timer times out, in ACT 37, the control unit 21 discriminates a condition code "m" set in the condition code memory 42. The control unit 21 executes processing corresponding to the condition code "m".

Figure 9:
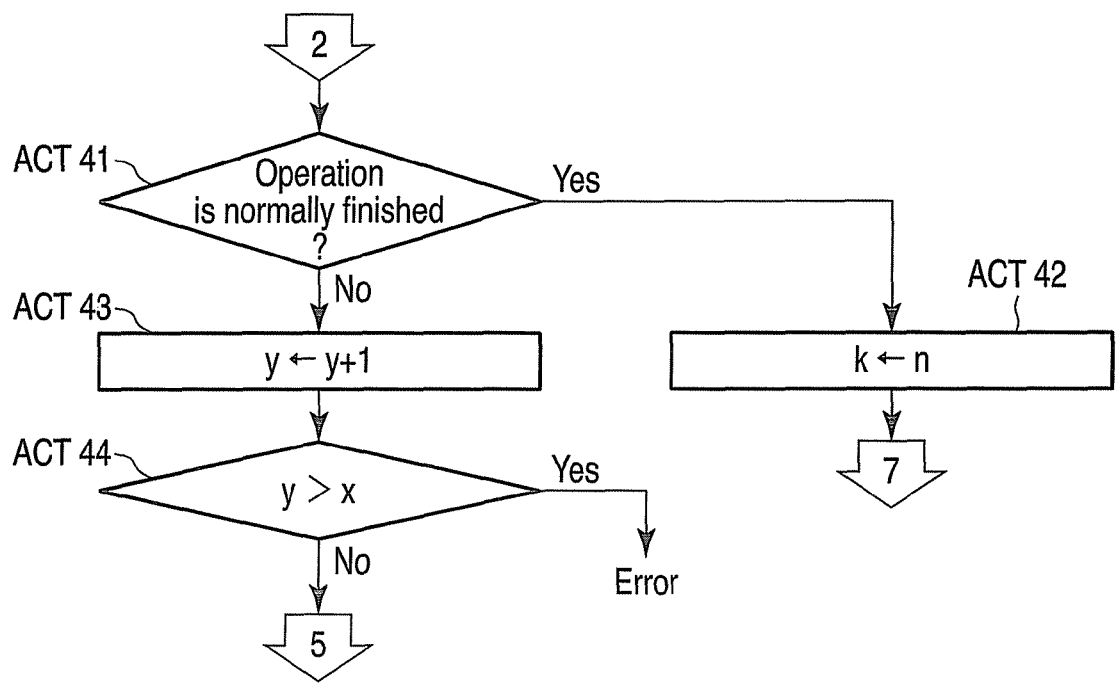
FIG. 9 is a flowchart of a processing procedure after a condition code "m" is "C0" in ACT 37 in FIG. 8.

In the case of the reader writer 4-1, since the condition code "m" is "C0", the control unit 21 executes processing shown in a flowchart of FIG. 9. In ACT 41, the control unit 21 determines whether a read operation or a write operation is normally finished. If the read operation or the write operation is normally finished, in ACT 42, the control unit 21 overwrites the count value "n" at the present point of the channel counter memory 44 in the initial frequency memory 43 as the next initial frequency "k". Thereafter, the control unit 21 returns to the processing in ACT 26.

If the operation cannot be normally finished (NO in ACT 41), in ACT 43, the control unit 21 increments the count value "y" of the retry counter memory 46 by "1". In ACT 44, the control unit 21 determines whether the count value "y" exceeds a set value "x" stored in the retry-number-of-times set value memory 45. If the count value "y" does not exceed the set value "x" (NO in ACT 44), the control unit 21 returns to the processing in ACT 30. If the count value "y" exceeds the set value "x", the control unit 21 determines that an error occurs.

In this way, if the reader writer 4-1, in which the condition code C0 and the pattern code P5 are set, receives a read command or a write command, first, the reader writer 4-1 executes carrier sense in the radio channel cn4. If a carrier sense error occurs, the reader writer 4-1 executes carrier sense in the radio channel cn6. Thereafter, the reader writer 4-1 switches a radio channel in order of cn5, cn4, cn6, and cn5 until a free channel is detected. If a free channel is detected, the reader writer 4-1 executes a read operation or a write operation using the free channel.

If the operation is normally finished, the reader writer 4-1 stores the used radio channel in the initial frequency memory 43. If the next command is received, the reader writer 4-1 starts carrier sense from the radio channel used last time.

Operations performed when the power supply for the reader writer 4-2 is turned on are explained. When the power supply is turned on, the control unit 21 of the reader writer 4-2 transmits a setting data inquiry command including the identification code [RWID2] to the store server 2 (ACT 21). The store server 2 reads out the condition code C1 and the pattern code P4 corresponding to the identification code [RWID2] from the reader writer setting table 13. The control unit 21 creates channel pattern data [cn9, cn8, cn2, cn1, 0, 0, 0, 0, 0] on the basis of selection order data corresponding to the pattern code P4. The store server 2 returns a setting data response command including the condition code C1 and the channel pattern data [cn9, cn8, cn2, cn1, 0, 0, 0, 0, 0].

The control unit 21 of the reader writer 4-2 receives the response command and stores the condition code C1 in the response command in the condition code memory 42 (ACT 23). The control unit 21 sets the channel pattern data [cn9, cn8, cn2, cn1, 0, 0, 0, 0, 0] in the response command in the channel pattern table 41 (ACT 24). Further, the control unit 21 initializes the value "k" of the initial frequency memory 43 to "1" (ACT 25).

Thereafter, if a read command or a write command is input from the POS terminal 1-2 (YES in ACT 26), the control unit 21 switches a radio channel in order of cn9, cn8, cn2, and cn1 and executes carrier sense (ACT 30). As a result, if a free channel is detected (NO in ACT 31), the control unit 21 executes command processing at a frequency of the free channel (ACT 35).

If the read operation or the write operation is finished or the operation limiting timer times out (YES in ACT 36), the control unit 21 discriminates the condition code "m" set in the condition code memory 42 (ACT 37). The control unit 21 executes processing corresponding to the condition code "m".

Figure 10:
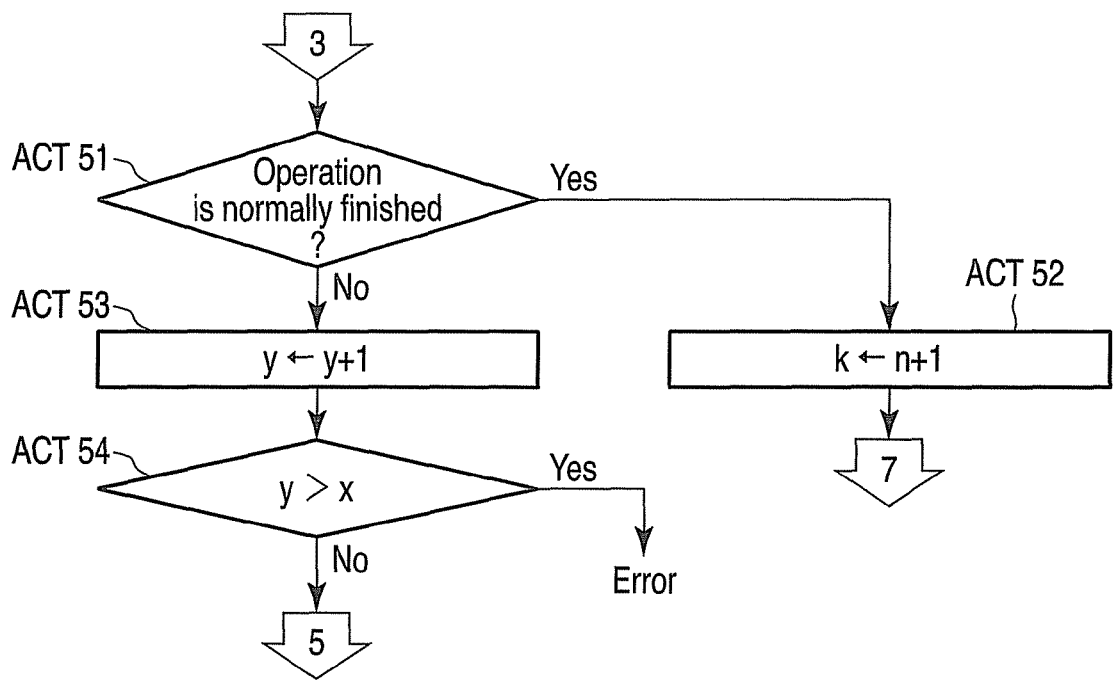
FIG. 10 is a flowchart of a processing procedure after the condition code "m" is "C1" in ACT 37 in FIG. 8.

In the case of the reader writer 4-2, since the condition code "m" is "C1", the reader writer 4-2 executes processing shown in a flowchart of FIG. 10. In ACT 51, the control unit 21 determines whether the read operation or the write operation is normally finished. If the operation is normally finished (YES in ACT 51), in ACT 52, the control unit 21 overwrites a value obtained by adding "1" to the count value "n" at the present point of the channel counter memory 44 in the initial frequency memory 43 as the next initial frequency "k". Thereafter, the control unit 21 returns to the processing in ACT 26.

If the operation cannot be normally finished (NO in ACT 51), in ACT 53, the control unit 21 increments the count value "y" of the retry counter memory 46 by "1". In ACT 54, the control unit 21 determines whether the count value "y" exceeds the set value "x". If the count value "y" does not exceed the set value "x" (NO in ACT 54), the control unit 21 returns to the processing in ACT 30. If the count value "y" exceeds the set value "x", the control unit 21 determines that an error occurs.

In this way, if the reader writer 4-2, in which the condition code C1 and the pattern code P4 are set, receives a read command or a write command, first, the reader writer 4-2 executes carrier sense in the radio channel cn9. If a carrier sense error occurs, the reader writer 4-2 executes carrier sense in the radio channel cn8. Thereafter, the reader writer 4-2 switches a radio channel in order of cn2, cn1, cn9, and cn8 until a free channel is detected. If a free channel is detected, the reader writer 4-2 executes a read operation or a write operation using the free channel.

If the operation is normally finished, the reader writer 4-2 stores a value obtained by adding "1" to the count value "n" at the present point of the channel counter memory 44 in the initial frequency memory 43 as the next initial frequency "k". Therefore, if the next command is received, the reader writer 4-2 automatically switches the radio channel used last time to the next radio channel in order same as that during the carrier sense and starts the next carrier sense.

Operations performed when the power supply for the reader writer 4-3 is turned on are explained. When the power supply is turned on, the control unit 21 of the reader writer 4-3 transmits a setting data inquiry command including the identification code [RWID3] to the store server 2 (ACT 21). The store server 2 reads out the condition code C2 and the pattern code P1 corresponding to the identification code [RWID3] from the reader writer setting table 13. The control unit 21 creates channel pattern data [cn1, cn2, cn3, cn4, cn5, cn6, cn7, cn8, cn9] on the basis of selection order data corresponding to the pattern code P1. The store server 2 returns a setting data response command including the condition code C2 and the channel pattern data [cn1, cn2, cn3, cn4, cn5, cn6, cn7, cn8, cn9].

The control unit 21 of the reader writer 4-3 receives the response command and stores the condition code C2 in the response command in the condition code memory 42 (ACT 23). The control unit 21 sets the channel pattern data [cn1, cn2, cn3, cn4, cn5, cn6, cn7, cn8, cn9] in the response command in the channel pattern table 41 (ACT 24). Further, the control unit 21 initializes the value "k" of the initial frequency memory 43 to "1" (ACT 25).

Thereafter, if a read command or a write command is input from the POS terminal 1-3 (YES in ACT 26), the control unit 21 switches a radio channel in order of cn1, cn2, cn3, cn4, cn5, cn6, cn7, cn8, and cn9 and executes carrier sense (ACT 30). As a result, if a free channel is detected (NO in ACT 31), the control unit 21 executes command processing at a frequency of the free channel (ACT 35).

If the read operation or the write operation is finished or the operation limiting timer times out (YES in ACT 36), the control unit 21 discriminates the condition code "m" set in the condition code memory 42 (ACT 37). The control unit 21 executes processing corresponding to the condition code "m".

Figure 11:
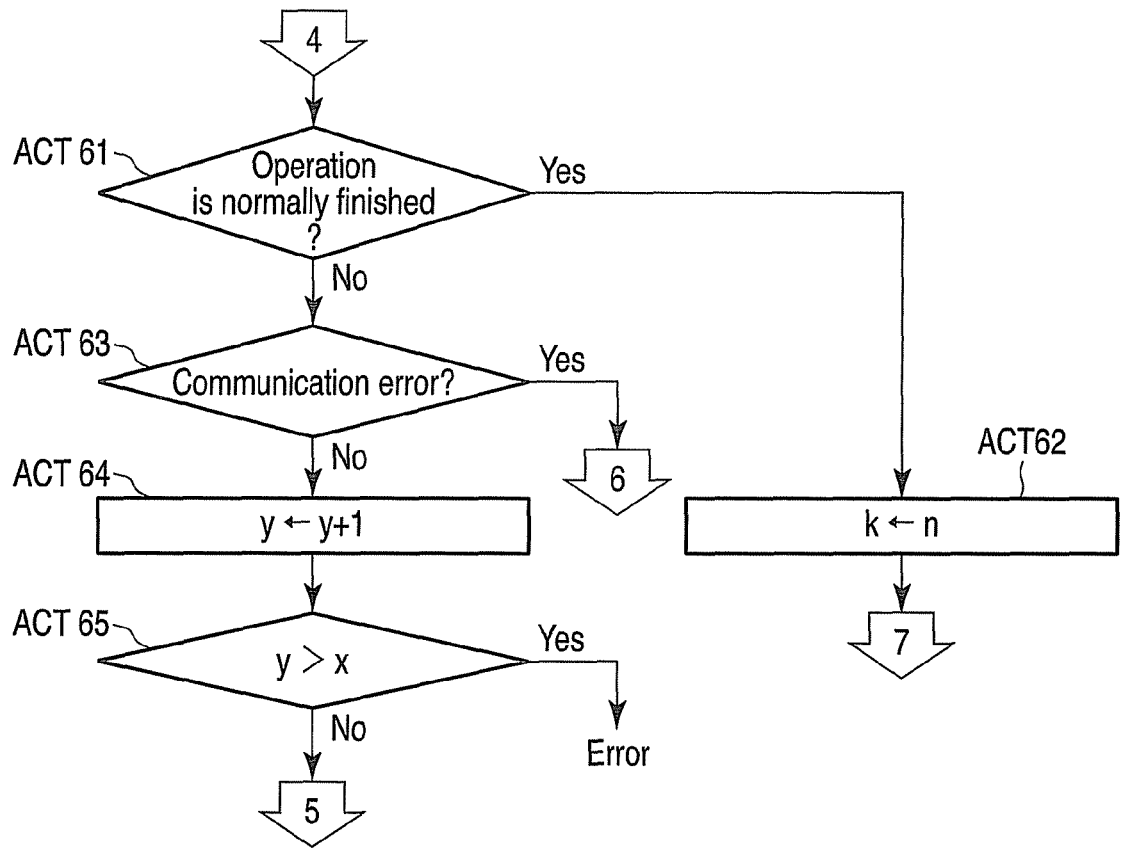
FIG. 11 is a flowchart of a processing procedure after the condition code "m" is "C2" in ACT 37 in FIG. 8.

In the case of the reader writer 4-3, since the condition code "m" is "C2", the reader writer 4-3 executes processing shown in a flowchart of FIG. 11. In ACT 61, the control unit 21 determines whether the read operation or the write operation is normally finished. If the operation is normally finished (YES in ACT 61), in ACT 62, the control unit 21 stores the count value "n" at the present point of the channel counter memory 44 in the initial frequency memory 43 as the next initial frequency "k". Thereafter, the control unit 21 returns to the processing in ACT 26.

If the operation cannot be normally finished (NO in ACT 61), in ACT 63, the control unit 21 discriminates whether the abnormal finish of the operation is caused by a communication error. If, although an RFID tag present in a communication area of the antenna 5-3 is detected, a bit loss error or a transformed bit error occurs in a procedure of data communication with the tag, data of the RFID tag cannot be normally read. If communication takes time and the operation limiting timer times out, data cannot be normally written in the RFID tag. Such an error is called communication error. If the abnormal finish of the operation is caused by the communication error, the control unit 21 proceeds to the processing in ACT 32.

On the other hand, an error in which an RFID tag present in the communication area of the antenna 5-3 cannot be detected is not a communication error. In this case, in ACT 64, the control unit 21 increments the count value "y" of the retry counter memory 46 by "1". In ACT 65, the control unit 21 determines whether the count value "y" exceeds the set value "x". If the count value "y" does not exceed the set value "x" (NO in ACT 65), the control unit 21 returns to the processing in ACT 30. If the count value "y" exceeds the set value "x", the control unit 21 determines that an error occurs.

In this way, if the reader writer 4-3, in which the condition code C2 and the pattern code P1 are set, receives a read command or a write command, first, the reader writer 4-3 executes carrier sense in the radio channel cn1. If a carrier sense error occurs, the reader writer 4-3 executes carrier sense in the radio channel cn2. Thereafter, the reader writer 4-3 switches a radio channel in order of cn3, cn4, cn5, cn6, cn7, cn8, cn9, cn1, and cn2 until a free channel is detected.

On the other hand, if the operation is not normally finished because of a communication error, the control unit 21 switches a working frequency in order same as that during the carrier sense and executes the operation again. However, in this case, since the retry counter memory 46 is not incremented, the control unit 21 repeatedly executes the operation while switching a frequency until the operation is normally finished.

Operations performed when the power supply for the reader writer 4-4 is turned on are explained. When the power supply is turned on, the control unit 21 of the reader writer 4-4 transmits a setting data inquiry command including the identification code [RWID4] to the store server 2 (ACT 21). The store server 2 reads out the condition code C0 and the pattern code P3 corresponding to the identification code [RWID4] from the reader writer setting table 13. The control unit 21 creates channel pattern data [cn7, cn9, cn3, cn1, 0, 0, 0, 0, 0] on the basis of selection order data corresponding to the pattern code P3. The store server 2 returns a setting data response command including the condition code C0 and the channel pattern data [cn7, cn9, cn3, cn1, 0, 0, 0, 0, 0].

The control unit 21 of the reader writer 4-4 receives the response command and stores the condition code C0 in the response command in the condition code memory 42 (ACT 23). The control unit 21 sets the channel pattern data [cn7, cn9, cn3, cn1, 0, 0, 0, 0, 0] in the response command in the channel pattern table 41 (ACT 24). Further, the control unit 21 initializes the value "k" of the initial frequency memory 43 to "1" (ACT 25).

Thereafter, if a read command or a write command is input from the POS terminal 1-4 (YES in ACT 26), the control unit 21 switches a radio channel in order of cn7, cn9, cn3, and cn1 and executes carrier sense (ACT 30). As a result, if a free channel is detected (NO in ACT 31), the control unit 21 executes command processing at a frequency of the free channel (ACT 35).

If the read operation or the write operation is finished or the operation limiting timer times out (YES in ACT 36), the control unit 21 discriminates the condition code "m" set in the condition code memory 42 (ACT 37). The control unit 21 executes processing corresponding to the condition code "m".

In the case of the RFID reader writer 4-4, since the condition code "m" is "C0", the reader writer 4-4 executes the processing shown in the flowchart of FIG. 10 in the same manner as the reader writer 4-1.

In this way, if the reader writer 4-4, in which the condition code C0 and the pattern code P3 are set, receives a read command or a write command, first, the reader writer 4-4 executes carrier sense in the radio channel cn7. If a carrier sense error occurs, the reader writer 4-4 executes carrier sense in the radio channel cn9. Thereafter, the reader writer 4-4 switches a radio channel in order of cn3, cn1, cn7, and cn9 until a free channel is detected. If a free channel is detected, the reader writer 4-4 executes a read operation or a write operation using the free channel.

If the operation is normally finished, the reader writer 4-4 stores the used radio channel in the initial frequency memory 43. If the next command is received, the reader writer 4-4 starts carrier sense from the radio channel used last time.

As explained above, according to this embodiment, the respective reader writers 4-1 to 4-4 are different from one another in switching order for radio channels used by the reader writers. Therefore, even if a communication error occurs because of the influence of the other reader writers having adjacent communication areas, the respective reader writers 4-1 to 4-4 are switched to radio channels different from one another in the next span. Therefore, it is possible to prevent a communication error.

According to this embodiment, the number of radio channels in use can be set for each of the reader writers 4-1 to 4-4. Moreover, conditions for switching a radio frequency can be changed for each of the reader writers 4-1 to 4-4. Therefore, since the respective reader writers 4-1 to 4-4 can more surely prevent a communication error, it is possible to improve communication efficiency.

Further, according to this embodiment, the respective reader writers 4-1 to 4-4 can individually set switching condition data for radio channels thereof. Therefore, since the respective reader writers 4-1 to 4-4 can be set to switch radio channels under conditions different from those of the other reader writers having adjacent communication areas, it is possible to more surely prevent a communication error.

The present invention is not limited to the embodiment per se. The elements of the present invention can be modified and embodied without departing from the spirit of the present invention at an implementation stage.

For example, in the embodiment, in ACT 63 in FIG. 11, the control unit 21 determines whether the operation cannot be normally finished because of a communication error and, only if the operation cannot be normally finished because of a communication error, switches a radio channel in use. However, the control unit 21 may switch a radio channel in use irrespective of whether the operation cannot be normally finished because of a communication error. However, in this case, even when an RFID tag is not present in a communication area of an antenna, a radio frequency is switched and the operation is executed again. Therefore, in FIG. 11, it is sufficient to delete the processing step in ACT 63 and, when the determination result in the processing step in ACT 65 is NO, proceed to the processing step in ACT 32.

Figure 7:
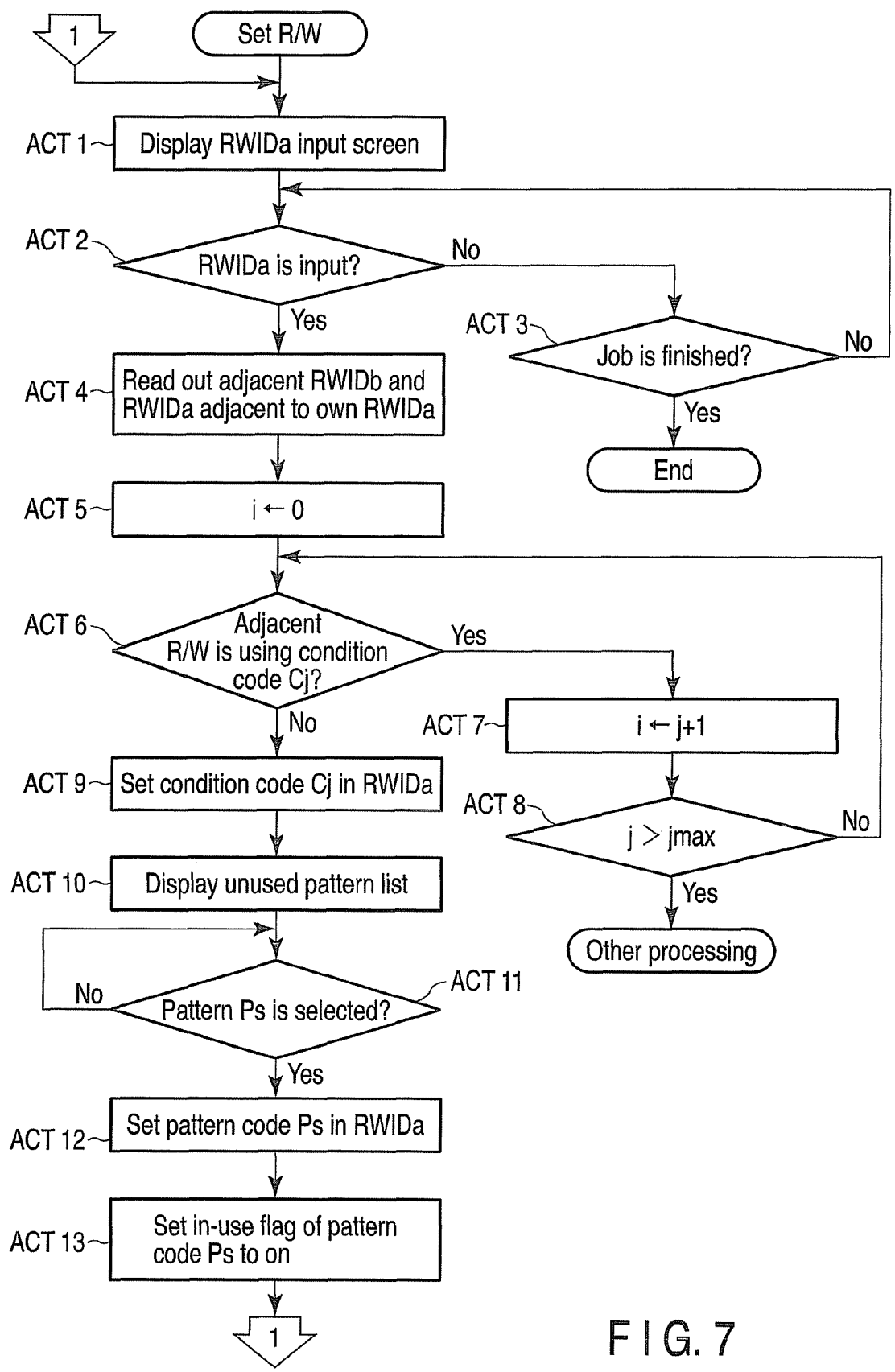
FIG. 7 is a flowchart of a main processing procedure of a reader writer setting job executed in the store server according to the embodiment.
Figure 8:
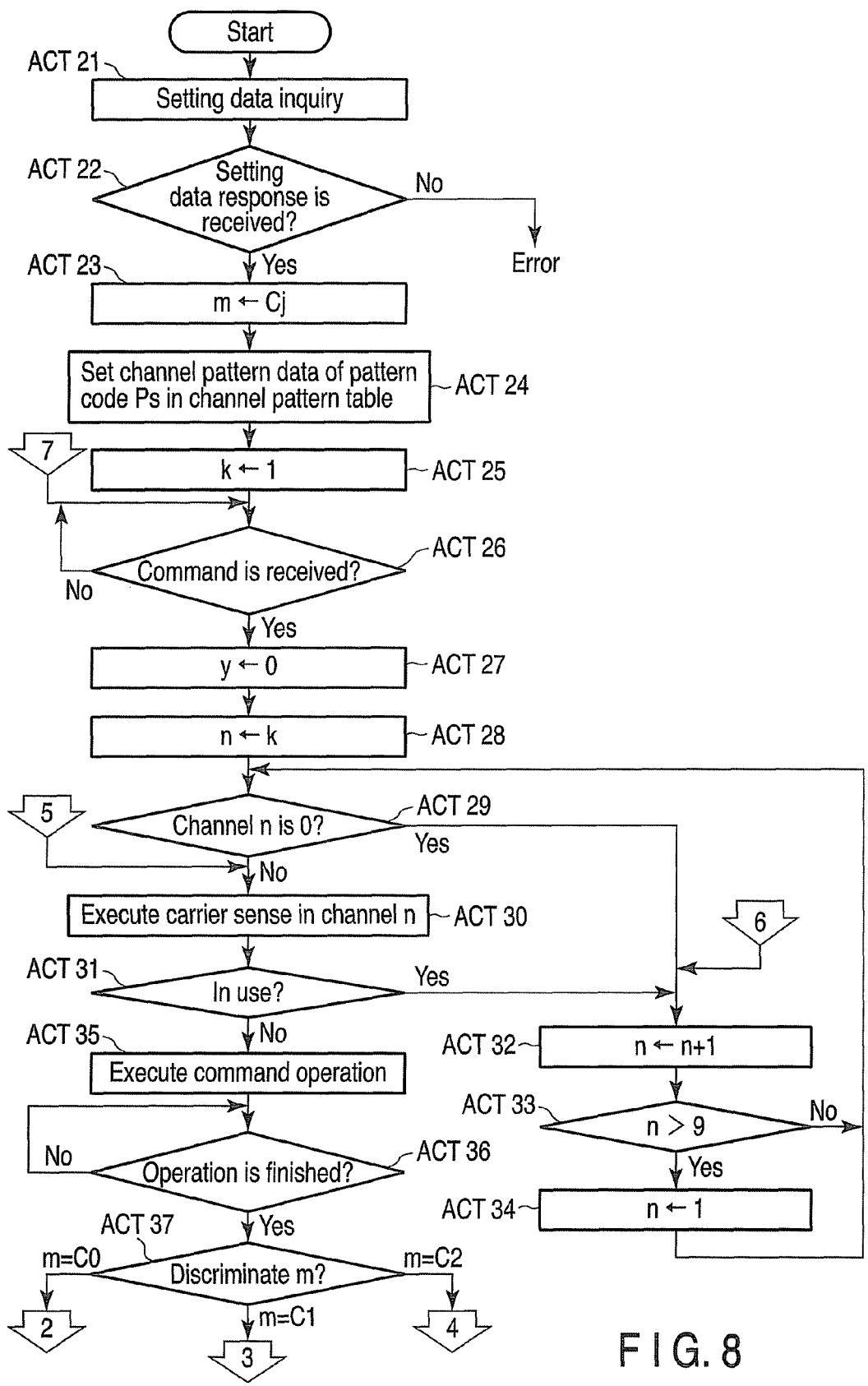
FIG. 8 is a flowchart of a main processing procedure executed by a control unit of the RFID reader writer in the embodiment.

In the embodiment, the store server 2 executes the reader writer setting job in the procedure shown in the flowchart of FIG. 7 to thereby set a condition code and a pattern code for each of the reader writers 4-1 to 4-4 in the reader writer setting table 13. However, a procedure for setting a condition code and a pattern code in the reader writer setting table 13 is not limited to this. For example, it is also possible that plural patterns of combination data of condition codes and pattern codes are prepared in advance and the user of the system selects desired patterns out of the plural patterns and sets the patterns in the respective reader writers 4-1 to 4-4.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A radio communication system comprising; plural radio communication apparatuses configured to execute radio communication with a radio communication medium comprising an IC chip and an antenna over a free channel detected in plural radio channels, and a server connecting with each of the plural radio communication apparatuses over a network, the server comprising:
a first table configured to store plural types of switching condition data specifying a condition for executing switching of the radio channels for searching for the free channel of the plural radio channels;

a second table configured to store plural types of channel pattern data specifying an order in which the plural radio channels are switched to search for the free channel;

a third table configured to store, in association with an identification code to identify each of the plural radio communication apparatuses, an identification code of a radio communication apparatus adjacent to a radio communication apparatus specified by the identification code, and store the switching condition data and the channel pattern data set for the radio communication apparatus specified by the identification code;

a switching condition setting unit configured to, when one of the plural radio communication apparatuses is selected, acquire from the third table an identification code of a radio communication apparatus adjacent to the selected radio communication apparatus, search the third table with the acquired identification code, and set one element of the switching condition data stored in the first table other than the switching condition data stored in association with the identification code corresponding to the identification code of the acquired radio communication apparatus, in the third table, in association with an identification code of the selected radio communication apparatus; and a switching pattern setting unit configured to, when one of the plural radio communication apparatuses is selected, search the third table, and set one element of the channel pattern data stored in the second table other than the channel pattern data stored in association with an identification code of a radio communication apparatus other than the selected radio communication apparatus, in the third table, in association with an identification code of the selected radio communication apparatus, each of the plural radio communication apparatuses comprising:

a condition storing unit configured to receive from the server the switching condition data set in the third table in association with an own identification code and store the received switching condition data;

a pattern storing unit configured to receive from the server the channel pattern data set in the third table in association with the own identification code and store the received channel pattern data; and a channel switching unit configured to, if the condition of the switching condition data stored in the condition storing unit is met, execute switching of the radio channel for searching for the free channel of the plural radio channels, based on the channel pattern data stored in the pattern storing unit.

2. The system according to claim 1, wherein the switching condition data stored in the first table includes a condition for executing the switching of the radio channel when a carrier sense error occurs.

3. The system according to claim 1, wherein the switching condition data stored in the first table includes a condition for executing the switching of the radio channel after a command for the radio communication medium is executed.

4. The system according to claim 1, wherein the switching condition data stored in the first table includes a condition for executing the switching of the radio channel when, although a response signal from the radio communication medium is received, an error occurs in a procedure of data communication with the radio communication medium.

5. A radio communication method in a system comprising:

plural radio communication apparatuses configured to execute radio communication with a radio communication medium comprising an IC chip and an antenna over a free channel detected in plural radio channels, and a server connecting with each of the plural radio communication apparatuses over a network, the server being configured to:

store in a first table plural types of switching condition data specifying a condition for executing switching of the radio channels for searching for the free channel of the plural radio channels;

store in a second table plural types of channel pattern data specifying an order in which the plural radio channels are switched to search for the free channel;

store in a third table, in association with an identification code to identify each of the plural radio communication apparatuses, an identification code of a radio communication apparatus adjacent to a radio communication apparatus specified by the identification code, and store the switching condition data and the channel pattern data set for the radio communication apparatus specified by the identification code;

when one of the plural radio communication apparatuses is selected, acquire from the third table an identification code of a radio communication apparatus adjacent to the selected radio communication apparatus;

search the third table with the acquired identification code, and set one element of the switching condition data stored in the first table other than the switching condition data stored in association with the identification code corresponding to the identification code of the acquired radio communication apparatus, in the third table, in association with an identification code of the selected radio communication apparatus; and when one of the plural radio communication apparatuses is selected, search the third table, and set one element of the channel pattern data stored in the second table other than channel pattern data stored in association with an identification code of a radio communication apparatus other than the selected radio communication apparatus, in the third table, in association with an identification code of the selected radio communication apparatus, each of the plural radio communication apparatuses being configured to, if the condition of the switching condition data set in the third table in association with an own identification code is met in the radio communication with the radio communication medium, execute switching of the radio channel for searching for the free channel of the plural radio channels, based on the channel pattern data set in the third table in association with the own identification code.

6. A server connecting with each of plural radio communication apparatuses configured to execute radio communication with a radio communication medium comprising an IC chip and an antenna over a free channel detected in plural radio channels, over a network, the server comprising:

a first table configured to store plural types of switching condition data specifying a condition for executing switching of the radio channels for searching for the free channel of the plural radio channels;

a second table configured to store plural types of channel pattern data specifying an order in which the plural radio channels are switched to search for the free channel;

a third table configured to store, in association with an identification code to identify each of the plural radio communication apparatuses, an identification code of a radio communication apparatus adjacent to a radio communication apparatus specified by the identification code, and store the switching condition data and the channel pattern data set for the radio communication apparatus specified by the identification code;

a switching condition setting unit configured to, when one of the plural radio communication apparatuses is selected, acquire from the third table an identification code of a radio communication apparatus adjacent to the selected radio communication apparatus, search the third table with the acquired identification code, and set one element of the switching condition data stored in the first table other than the switching condition data stored in association with the identification code corresponding to the identification code of the acquired radio communication apparatus, in the third table, in association with an identification code of the selected radio communication apparatus; and a switching pattern setting unit configured to, when one of the plural radio communication apparatuses is selected, search the third table, and set one element of the channel pattern data stored in the second table other than the channel pattern data stored in association with an identification code of a radio communication apparatus other than the selected radio communication apparatus, in the third table, in association with an identification code of the selected radio communication apparatus.

7. The server according to claim 6, wherein the switching condition data stored in the first table includes a condition for executing the switching of the radio channel when a carrier sense error occurs.

8. The server according to claim 6, wherein the switching condition data stored in the first table includes a condition for executing the switching of the radio channel after a command for the radio communication medium is executed.

9. The server according to claim 6, wherein the switching condition data stored in the first table includes a condition for executing the switching of the radio channel when, although a response signal from the radio communication medium is received, an error occurs in a procedure of data communication with the radio communication medium.

* * * * *